United States Patent
Eliás et al.

(10) Patent No.: US 9,003,382 B2
(45) Date of Patent: Apr. 7, 2015

(54) EFFICIENT JUST-IN-TIME COMPILATION

(71) Applicant: Red Hat, Inc., Raleigh, NC (US)

(72) Inventors: Filip Eliás, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 42 days.

(21) Appl. No.: 13/769,410

(22) Filed: Feb. 18, 2013

(65) Prior Publication Data

US 2014/0237458 A1 Aug. 21, 2014

(51) Int. Cl.
*G06F 9/45* (2006.01)

(52) U.S. Cl.
CPC .................................. *G06F 8/41* (2013.01)

(58) Field of Classification Search
None
See application file for complete search history.

(56) References Cited

U.S. PATENT DOCUMENTS

| | | | |
|---|---|---|---|
| 7,421,687 B1* | 9/2008 | Yellin et al. | 717/148 |
| 7,493,604 B2* | 2/2009 | Mariani | 717/148 |
| 8,392,898 B2* | 3/2013 | Pirvu | 717/148 |
| 8,490,065 B2* | 7/2013 | Archambault et al. | 717/130 |
| 8,539,464 B2* | 9/2013 | Partridge et al. | 717/148 |
| 2003/0051043 A1* | 3/2003 | Wyschogrod et al. | 709/230 |
| 2006/0048114 A1* | 3/2006 | Schmidt | 717/148 |
| 2012/0023488 A1* | 1/2012 | Morris | 717/137 |
| 2014/0095506 A1* | 4/2014 | Branson et al. | 707/737 |

OTHER PUBLICATIONS

Hagger, "Java bytecode", IBM Developer Works, Jul. 1, 2001.*
Haggar, Peter, "Java bytecode: Understanding bytecode makes you a better programmer," IBM DeveloperWorks: http://www.ibm.com/developerworks/ibm/library/it-haggar_bytecode/.
Venners, Bill, "Bytecode basics, A first look at the bytecodes of the Java virtual machine," Javaworld: http://www.javaworld.com/jw-09-1996/jw-09-bytecodes.html.

* cited by examiner

*Primary Examiner* — Isaac T Tecklu
*Assistant Examiner* — Hossain Morshed
(74) *Attorney, Agent, or Firm* — Lowenstein Sandler LLP

(57) ABSTRACT

Systems and methods for just-in-time (JIT) code compilation by a computer system. An example method may comprise identifying a defined pattern in a byte stream, evaluating a conditional expression associated with the pattern, and compiling the byte stream into a native code, while excluding, in view of the evaluating, a portion of byte stream associated with the pattern.

20 Claims, 5 Drawing Sheets

```
<SKIP expression>:= SKIP(<skip_expression>) { <expression>}
<skip_expression> := <number> | <condition>
<expression> := <language expression>
<condition> := <system property> <operator> <quoted value>
<operator> := == | != | like | > | <
```

FIG. 2

```
iterateMethod(){
 someOperation();
 skip(2){
 logDebug();
 }
 skip(1){
 logError();
 }
}
```

FIG. 3

```
iterateMethod(){
someOperation();
 if(debug.IsEnabled()){
 logDebug();
 }
 if(error.IsEnabled()){
 logError();
 }
}
```

FIG. 4

EFFICIENT JUST-IN-TIME COMPILATION

TECHNICAL FIELD

The present disclosure is generally related to computer systems, and is more specifically related to methods and systems for high-level language just-in-time compilation.

BACKGROUND

Computer programs written in certain high-level programming languages, such as, for example, Java, may be converted to a platform-specific set of instructions by a two-stage process: a compiler may translate a program module written in the high level programming language into an interim representation, often referred to as "bytecode," which then may be translated into a platform-specific set of instructions by a virtual machine (such as, for example, Java virtual machine (JVM)). Since the virtual machine may run on various target platforms, the high-level programming language interpreted by the virtual machine may become platform independent to the extent of the virtual machine being implemented for a particular platform. Some virtual machines may include "Just-in-Time" (JIT) compilers to compile bytecode into a set of machine instructions at run time, thus improving the code execution efficiency by avoiding the necessity to repeatedly interpret sections of bytecode which are executed more than once.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 illustrates one example of a Backus-Naur Form (BNF) definition of the code exclusion language construct, in accordance with one or more aspects of the present disclosure;

FIGS. 3-4 illustrate examples of Java code employing the code exclusion construct, in accordance with one or more aspects of the present disclosure;

DETAILED DESCRIPTION

Described herein are methods and systems for just-in-time (JIT) compilation of bytecode derived from program modules created using high-level programming languages. Bytecode produced by a compiler of a high-level programming language, such as Java, may by compiled by a JIT compiler at run time to produce native executable code. A JIT compiler may be invoked to compile an entire class or one or more methods of a class. Since the compilation occurs at run time, the efficiency of compilation directly affects the execution speed.

To improve the run-time efficiency, the high-level programming language may be extended to include a language construct specifying a section of code to be conditionally excluded from the scope of compilation by a JIT compiler. For example, a section of code may be marked as conditionally excludable from the compilation scope depending upon a defined program verbosity level (e.g., some messages outputted by a program may only be necessary for debugging purposes and hence may become superfluous in a production environment). In another example, a section of code may be marked as conditionally excludable from the compilation scope depending upon a particular execution platform, in order to prevent execution exceptions due to possible platform incompatibility (e.g., a section of code querying a local GPS receiver may only be pertinent to a mobile platform and thus may not execute properly on a desktop platform lacking the GPS receiver).

Thus, a conditional code exclusion language construct identifiable by a dedicated token (e.g., a keyword) may be defined in a high-level programming language, such as Java. The code exclusion construct may include a construct identifier token, a condition, and an excludable code section. A JIT compiler may, responsive to identifying in the bytecode stream a pattern corresponding to a code exclusion language construct, evaluate the condition associated with the code exclusion construct. Should the condition evaluation yield a true value, the JIT compiler may exclude from the compilation scope a section of code associated with the code exclusion construct.

Various aspects of the above referenced methods and systems are described in details herein below by way of examples, rather than by way of limitation.

Figure 1:
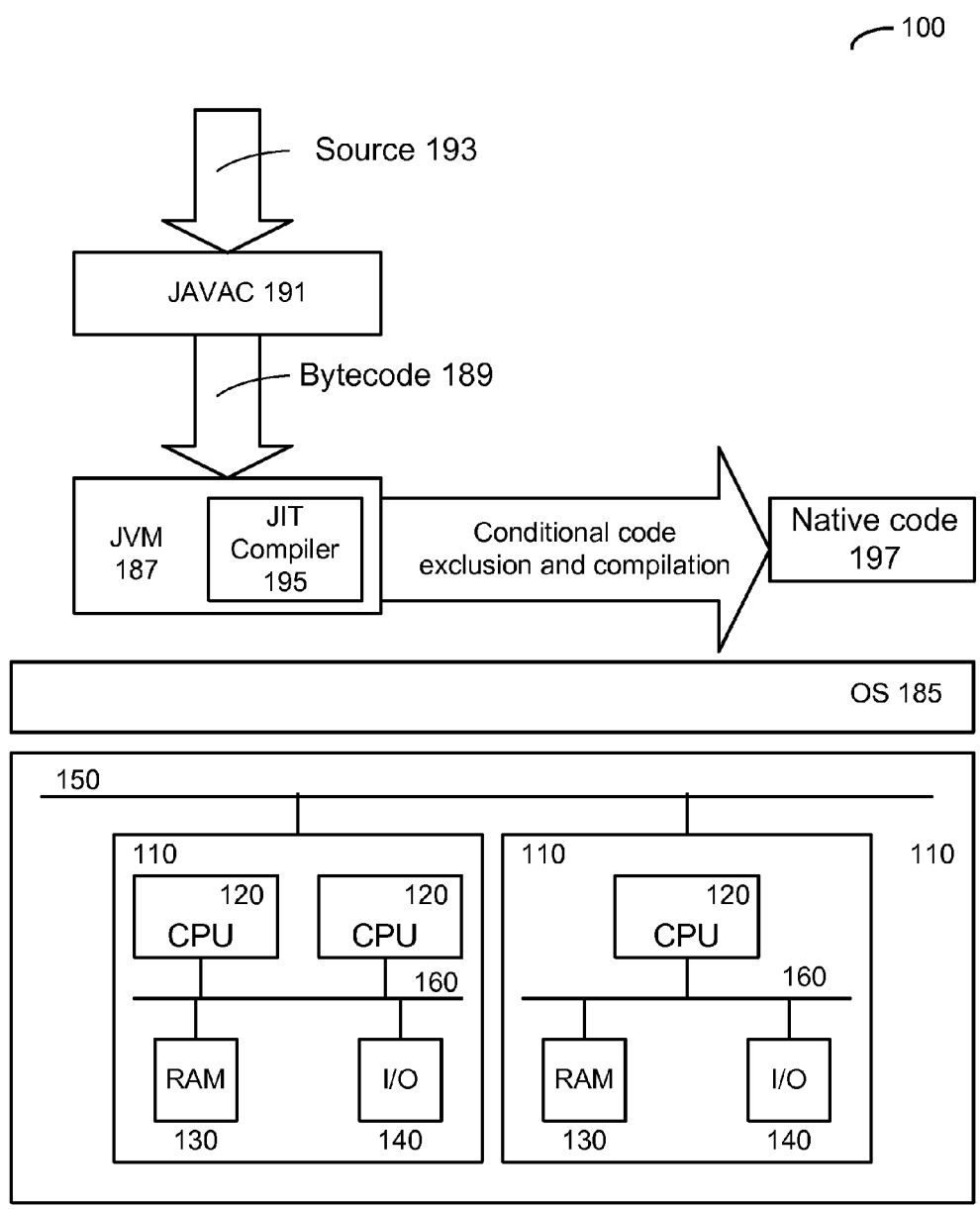
FIG. 1 depicts a component diagram of an example computer system for just-in-time code compilation, in accordance with one or more aspects of the present disclosure.

FIG. 1 depicts a high-level component diagram of an example computer system 100 in accordance with one or more aspects of the present disclosure. The computer system 100 may include one or more interconnected nodes 110. "Node" herein shall refer to a group of one or more processors and one or more associated memory devices locally accessible by the processors in the group. Each node 110 may in turn include one or more physical processors 120 communicatively coupled to memory devices 130 and input/output (I/O) devices 140.

"Physical processor" or "processor" herein shall refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Processors 120 may be interconnected using a variety of techniques, ranging from a point-to-point processor interconnect, to a system area network 150, as shown in FIG. 1. Local connections within each node 110, including the connections between a processor 120 and a memory 130 and between a processor 120 and an I/O device 140 may be provided by one or more local buses 160 of suitable architecture, for example, PCI.

Operating system 185 executable by the computer system 100 may run a JVM 187 to execute Java-based applications. Alternatively, the JVM 187 may be implemented to run directly on hardware of the computer system 100. The JVM 187 may be operational to input bytecode stream 189 produced by a compiler (such as, for example, javac) 191 based on one or more high-level programming language modules (such as, for example, Java source files) 193. A high-level programming language module can be provided by a text file including a plurality of statements in a high-level programming language representing one or more units of compilation, including, for example, declarations, functions, routines, and/or methods.

The bytecode stream 189 may be provided by a file or any other suitable stream type, including, for example, a network socket. In one example, JVM 187 may include a JIT compiler 195 which may compile the bytecode stream 189 and output native code 197 ready to be executed by one or more processors 120. The JIT compiler 195 may be designed to produce platform-specific native code optimized to most efficiently use the features and capabilities of the computer system 100.

As noted herein above, in one example, the JIT compiler 195 may recognize and process the code exclusion language constructs. "Language construct" herein shall refer to a syntactically allowable part of a computer program that may be formed using one or more lexical tokens.

The code exclusion language construct may be used to specify a section of code to be conditionally excluded by a JIT compiler from the scope of compilation, for example, the code execution of which is not needed in the current execution environment (e.g., sections of code producing debug-level messages) and/or may lead to execution exceptions due to platform incompatibility (e.g., sections of code exploiting platform-specific capabilities). The conditional code exclusion language construct may include a defined token (such as, in one illustrative example, SKIP keyword), a condition to be evaluated by the JIT compiler, and a section of code to be excluded from the compilation scope should evaluating the condition yield a true value.

FIG. 2 illustrates one example of a Backus-Naur Form (BNF) definition of the code exclusion language construct for Java. In one example, the construct may include SKIP keyword followed by a conditional expression and a section of code including one or more language expressions. In one example, the conditional expression may include an integer value representing the priority level of the section of code which follows the conditional expression. In operation, the JIT compiler may compare the integer value with the JVM-wide priority level specified, e.g., as a system property value or via a command line switch. The JIT compiler may exclude from the compilation scope the section of code following the conditional expression if the priority level of the code section specified by the SKIP conditional expression exceeds the JVM-wide priority level.

Alternatively, the condition may be specified as an identifier of a system variable (e.g., a Java system property symbolic name) followed by an operator and a constant value. The JIT compiler may evaluate the condition by comparing the system value and the variable using the specified operator.

Responsive to evaluating the condition, the JIT compiler may either exclude or include into the scope of compilation the code section specified by the code exclusion language construct. In one example, illustrated by a code fragment reproduced in FIG. 3, iterateMethod( ) method invokes someOperation( ) method and then creates log entries containing debugging information and error messages, by invoking logDebug( ) and logError( ) methods, respectively. At development and testing stages, both logDebug( ) and logError( ) methods may be useful. However, in a production environment, the debugging information outputted by logDebug( ) method may be superfluous, by potentially adversely affecting the overall system performance and/or consuming the available filesystem space, which might be at premium, e.g., for embedded applications. The code fragment reproduced in FIG. 3 improves the code execution efficiency by preceding the calls to logDebug( ) and logError( ) methods with skip( ) statements, such that the priority level of the skip( ) statement preceding logDebug( ) method invocation is higher than the priority level of the skip( ) statement preceding logError( ) method invocation. In a development or testing environment, the JVM-wide code priority level may be assigned the value which is more or equal to the priority level of the skip( ) statement preceding logDebug( ) method, and hence evaluating both skip( ) conditions yields false values, and both logDebug( ) and logError( ) methods are invoked. In a production environment, the JVM-wide code priority level may be assigned a value which is less than the priority level of the skip( ) statement preceding logDebug( ) method, and hence evaluating the first skip( ) condition yields a true value, thus forcing the JIT compiler to exclude from the compilation scope the invocation of logDebug( ) method; evaluating the second skip( ) condition yields a false value, and hence logError( ) method is invoked.

In another example, illustrated by a code fragment reproduced in FIG. 4, the skip( ) statement facilitates conditional exclusion from the compilation scope of the error checking code, which might be useful for an environment where run-time efficiency is preferred over the application stability. In the example of FIG. 4, the data pointer is initialized by some Operation( ) method. The subsequent comparison of the pointer to the null value is designed to prevent possible attempts to de-reference the null pointer. By employing the skip( ) statement, the comparison may be excluded from the scope of compilation if the disable_checks system property has a value of true, thus improving the run-time efficiency of the resulting code.

While functionality which is similar to that of the two illustrative examples described herein above may also be achieved by using conditional statements of the high-level language, employing code exclusion constructs rather than conditional statements may improve the overall run-time performance by effectively reducing the amount of code to be compiled by the JIT compiler at run time.

Figure 5:
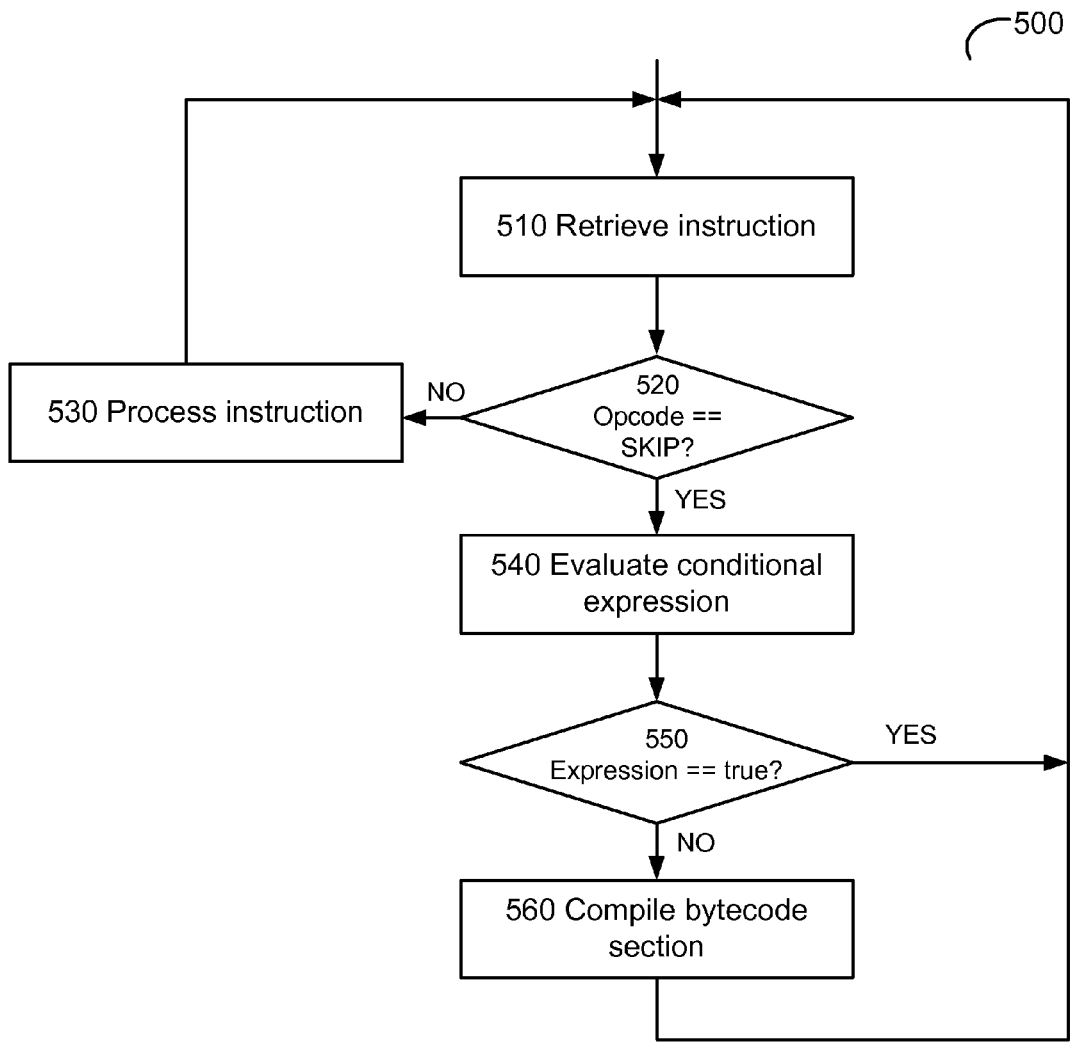
FIG. 5 depicts a flow diagram of an example method for just-in-time code compilation, in accordance with one or more aspects of the present disclosure.

FIG. 5 depicts a flow diagram of an example method 500 for JIT compilation. The method 500 may be performed by a computer system that may comprise hardware (e.g., circuitry, dedicated logic, and/or programmable logic), software (e.g., instructions executable on a computer system to perform hardware simulation), or a combination thereof. The method 500 and/or each of its individual functions, routines, subroutines, or operations may be performed by one or more physical processors of the computer system executing the method.

At block 510, the JIT compiler may retrieve the current instruction from the input stream. In one illustrative example, the input stream may be represented by Java bytecode produced by a Java compiler (such as, e.g., javac). Each instruction may include a one-byte opcode followed by zero or more operands.

At block 520, the JIT compiler may determine whether the opcode of the current instruction matches a pattern identifying the code exclusion language construct (e.g., an opcode corresponding to SKIP keyword). Responsive to ascertaining that the opcode of the current instruction matches the pattern, the JIT compiler may proceed to block 540; otherwise, the JIT compiler may process the current instruction at block 530 and then loop back to block 510 for processing the next instruction.

At block 540, the JIT compiler may evaluate the conditional expression associated with the current instruction. As noted herein above, the conditional expression may be specified as an integer value representing the priority level of the section of code following the condition or as a name of a system variable (e.g., a Java system property name) followed by an operator and a constant value.

Responsive to determining, at block 550, that the condition evaluates as true, the JIT compiler may exclude from the compilation scope the section of bytecode associated with the current token, by looping back to block 510 for processing the next instruction. Alternatively, the JIT compiler can, at block 560, compile the section of bytecode associated with the current instruction into a native code. The native code may be stored in a memory for execution by one or more processors.

Upon completing the operations schematically described by block 560, the JIT compiler may loop back to block 510 for processing the next instruction.

Figure 6:
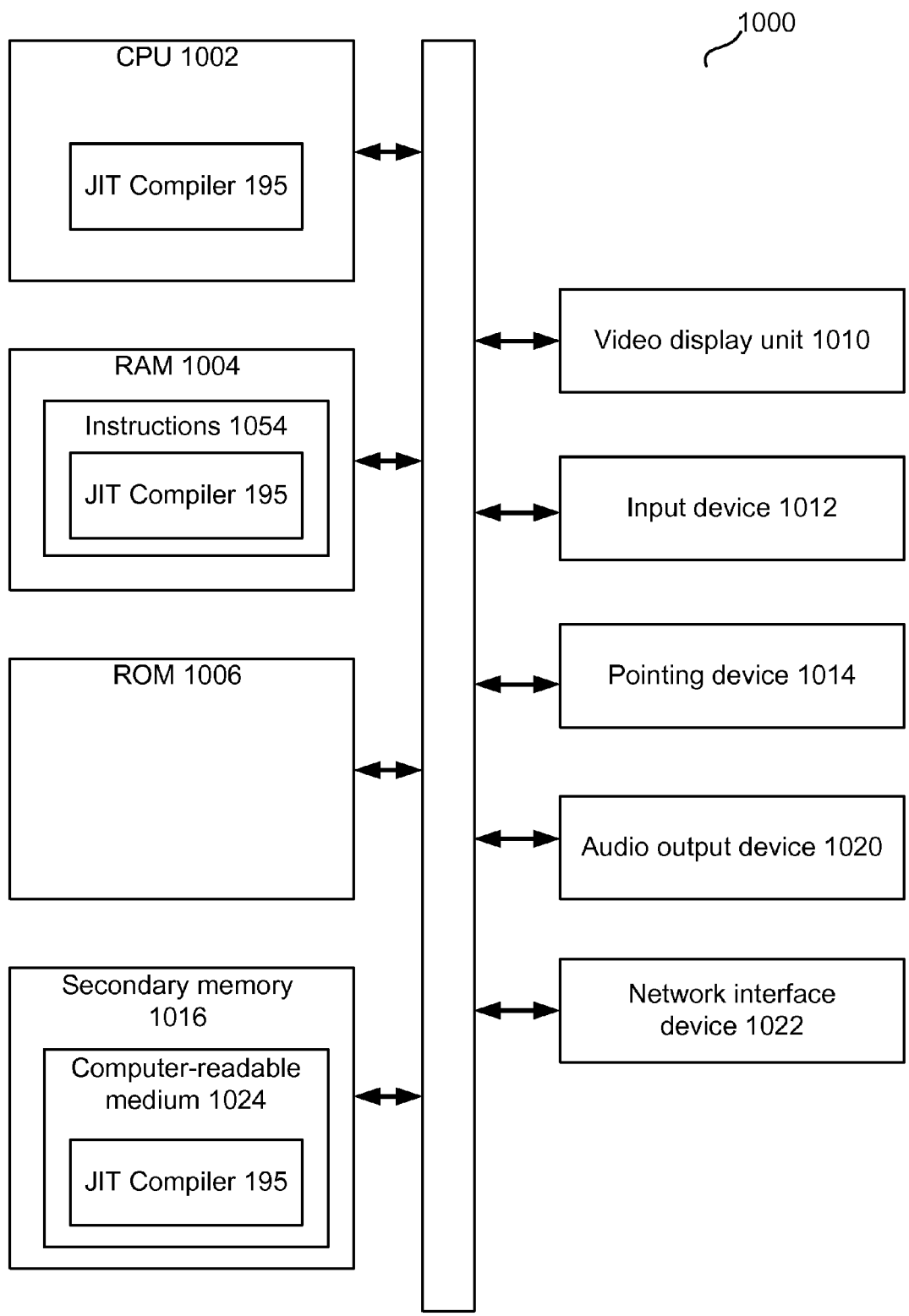
FIG. 6 depicts an illustrative computer system operating in accordance with examples of the invention.

FIG. 6 depicts an illustrative computer system operating in accordance with examples of the invention. In one example, computer system 1000 may correspond to the computer system 100 of FIG. 1.

In one example, the computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a tangible computer-readable storage medium 1024 on which may be stored instructions 1054 encoding the JIT compiler 195. The instructions 1054 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

The invention claimed is:

1. A method, comprising:
identifying, by a processor, a defined pattern in a byte stream derived from a high level programming language module;
evaluating a conditional expression associated with the defined pattern, wherein the conditional expression compares a system priority level to a value representing an execution priority level of a section of code associated with the conditional expression; and
compiling the byte stream into a native code, while excluding from compiling, in view of the comparing, a byte stream of the section of code associated with the defined pattern.

2. The method of claim 1, wherein the byte stream is provided by Java™ bytecode.

3. The method of claim 1, further comprising storing the native code in a memory for subsequent execution by the processor.

4. The method of claim 1, wherein the defined pattern comprises an opcode corresponding to a high-level programming language construct.

5. The method of claim 4, wherein the high-level programming language construct comprises a pre-defined keyword.

6. The method of claim 1, wherein the compiling is performed at run time.

7. The method of claim 1, wherein the conditional expression comprises an identifier of a system variable, an operator, and a constant value.

8. The method of claim 1, wherein the byte stream is provided by one of: a file or a network socket.

9. A non-transitory computer-readable storage medium comprising executable instructions that, when executed by a processor, cause the processor to:
identify, by the processor, a defined pattern in a byte stream derived from a high level programming language module;
evaluate a conditional expression associated with the defined pattern, wherein the conditional expression compares a system priority level to a value representing an execution priority level of a section of code associated with the conditional expression; and
compile the byte stream into a native code, while excluding from compiling, in view of the comparing, a byte stream of the section of code associated with the defined pattern.

10. The non-transitory computer-readable storage medium of claim 9, wherein the byte stream is provided by Java bytecode.

11. The non-transitory computer-readable storage medium of claim 9, further comprising executable instructions that cause the processor to store the native code in a memory for subsequent execution.

12. The non-transitory computer-readable storage medium of claim 9, wherein the defined pattern comprises an opcode corresponding to a high-level language construct.

13. The non-transitory computer-readable storage medium of claim 12, wherein the high-level programming language construct comprises a pre-defined keyword.

14. The non-transitory computer-readable storage medium of claim 9, wherein the conditional expression comprises an identifier of a system variable, an operator, and a constant value.

15. A system, comprising:
a memory; and
a processor, operatively coupled to the memory, to:
identify a defined pattern in a byte stream derived from a high level programming language module;
evaluate a conditional expression associated with the defined pattern, wherein the conditional expression compares a system priority level to a value representing an execution priority level of a section of code associated with the conditional expression; and
compile the byte stream into a native code, while excluding from compiling, in view of the comparing, a byte stream of the section of code associated with the defined pattern.

16. The system of claim 15, wherein the byte stream is provided by Java bytecode.

17. The system of claim 15, wherein the processor is further to store the native code in a memory for subsequent execution.

18. The system of claim 15, wherein the defined pattern comprises an opcode corresponding to a high-level language construct.

19. The system of claim 18, wherein the high-level programming language construct comprises a pre-defined keyword.

20. The system of claim 15, wherein the conditional expression comprises an identifier of a system variable, an operator, and a constant value.

* * * * *